(12) United States Patent
Taylor

(10) Patent No.: US 6,397,999 B1
(45) Date of Patent: Jun. 4, 2002

(54) BAGGAGE RECEIVING DEVICE

(76) Inventor: Laurence Edward Taylor, 94-818 Hohiu Pl., Waipahu, HI (US) 96797

( * ) Notice: Subject to any disclaimer, the term of this patent is extended or adjusted under 35 U.S.C. 154(b) by 0 days.

(21) Appl. No.: 09/477,089

(22) Filed: Jan. 3, 2000

Related U.S. Application Data

(60) Provisional application No. 60/114,677, filed on Jan. 4, 1999.

(51) Int. Cl.[7] ............................................... B65G 13/00
(52) U.S. Cl. ......................... 193/35 TE; 186/2; 186/59
(58) Field of Search .................. 193/35 TE; 198/836.3; 186/2, 4, 59, 60

(56) References Cited

U.S. PATENT DOCUMENTS

| | | | |
|---|---|---|---|
| 705,778 A | * 7/1902 | McCabe | 198/836.3 |
| 2,613,788 A | * 10/1952 | McLaughlin | 193/35 TE |
| 2,627,959 A | * 2/1953 | Seward | 193/35 TE |
| 2,627,960 A | * 2/1953 | Eberle | 193/35 TE |
| 2,718,296 A | * 9/1955 | Johnson | 198/836.3 |
| 2,760,617 A | * 8/1956 | Bowen | 193/35 TE |
| 2,815,849 A | * 10/1957 | Zumbrunnen | 193/35 TE |
| 2,822,913 A | 2/1958 | Craggs et al. | |
| 3,059,747 A | * 10/1962 | Sullivan | 193/35 TE |
| 3,068,983 A | 12/1962 | McLaughlin | 193/35 TE |
| 3,225,879 A | * 12/1965 | Falcon et al. | 193/35 TE |
| 3,378,125 A | * 4/1968 | Fogg | 193/35 TE |
| 3,666,073 A | 5/1972 | Lings et al. | |
| 3,704,773 A | 12/1972 | Lingg et al. | |
| 4,266,650 A | 5/1981 | Patel et al. | |
| 4,297,753 A | 11/1981 | Langren | |
| 4,852,712 A | 8/1989 | Best | |
| 5,147,025 A | 9/1992 | Flippo | |
| 5,224,584 A | 7/1993 | Best et al. | |
| 5,307,917 A | 5/1994 | Hall | |
| 5,325,953 A | * 7/1994 | Doster et al. | 193/35 TE |
| 5,487,462 A | 1/1996 | Gilmore | |
| 5,490,592 A | 2/1996 | Best et al. | |
| 5,636,728 A | 6/1997 | Best et al. | |
| 5,718,325 A | 2/1998 | Doster et al. | |
| 5,755,308 A | 5/1998 | Lindstrom et al. | |
| 5,796,052 A | 8/1998 | Christmann | |
| 5,944,169 A | * 8/1999 | Allen | 186/59 |
| 6,068,111 A | * 5/2000 | Smith et al. | 193/35 TE |

FOREIGN PATENT DOCUMENTS

| | | |
|---|---|---|
| SU | 421587 | 3/1974 |
| SU | 464489 | 9/1975 |
| SU | 486978 | 3/1976 |
| SU | 1570972 | 6/1990 |

* cited by examiner

Primary Examiner—Joseph E. Valenza
(74) Attorney, Agent, or Firm—Michael R. McKenna

(57) ABSTRACT

A baggage receiving device specifically designed for airport passenger luggage handling. It provides a telescoping conveyor system which can be installed in an airport terminal in connection with an airline ticket counter to assist airline personnel in initially processing a passenger's luggage without the need to lift the luggage between the baggage platform of the counter and the take-away conveyor running behind the ticket counter.

10 Claims, 2 Drawing Sheets

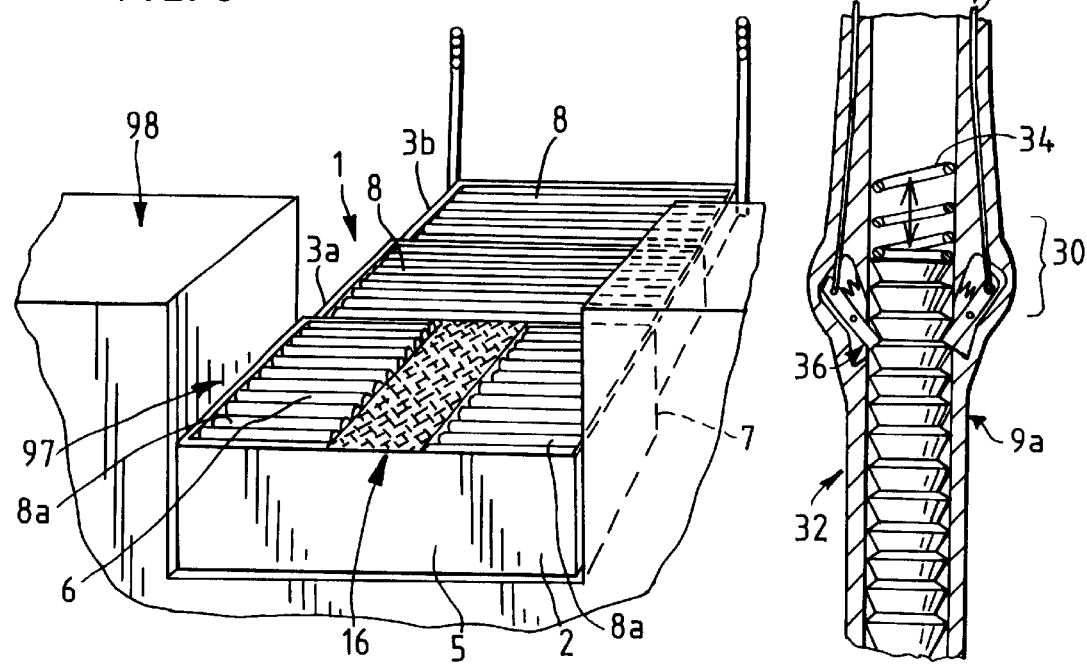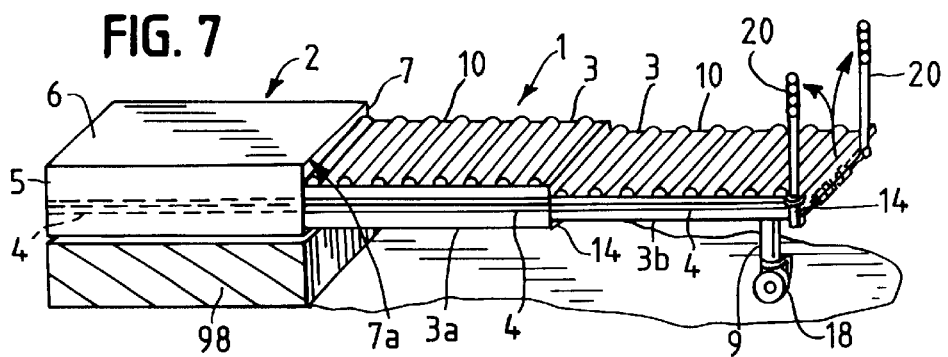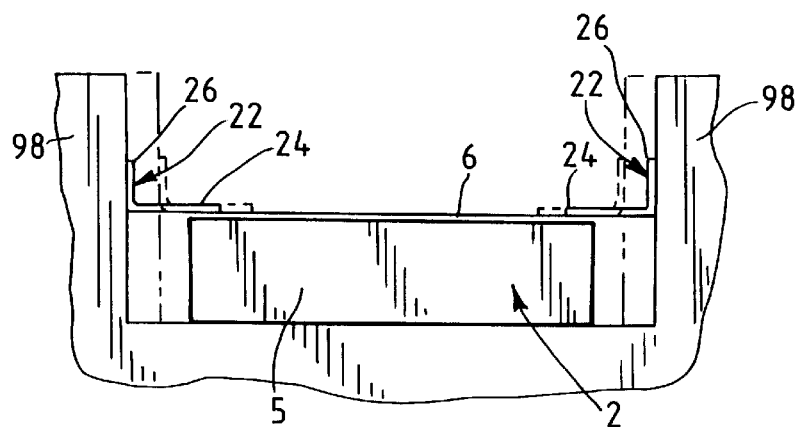

BAGGAGE RECEIVING DEVICE

This application claims priority to an earlier filed U.S. Provisional Application Serial No. 60/114,677 filed Jan. 4, 1999.

BACKGROUND OF THE INVENTION

This invention relates to a baggage receiving device specifically designed for airport passenger luggage handling, although it could easily be employed at a train station or other transport facility. The baggage receiving device comprises a receiving base, at least one carriage, and means for slidably connecting the at least one carriage to the receiving base. It provides a telescoping conveyor system which can be installed in an airport terminal in connection with an airline ticket counter to assist airline personnel in initially processing a passenger's luggage without the need to lift the luggage between the baggage platform of the counter and the take-away conveyor running behind the ticket counter.

It is a telescoping roller system which is installed on the baggage platform of any airport ticket counter. When the ticket counter position is in operation, the baggage receiving device is placed in an extended position, allowing the ticket counter agent to slide passenger's baggage to the baggage take-away conveyor without the need to lift it.

The device consists of a series of roller carriages. Each pair of devices consists of a receiving base and a series of roller carriages. The first carriage is housed in the receiving base and subsequent carriages are practically housed in the carriage unit from which they are retracted. As the device is extended, each of the roller carriages slides out until a conveyor system is established.

The baggage receiving device allows for regular airport personnel traffic behind the ticket counter as the device can be contracted to allow workers an unobstructed walk way. This device will save the aviation industry millions of dollars in work related back and shoulder injuries due to lifting bags at the airports around the country.

The receiving base has a front end, a top surface, and a rear end, with the rear end having an entryway. Each carriage has bi-directional rollers disposed on an upper surface of the carriage.

The carriage can move between a closed position in which the carriage is nested substantially below the top surface of the receiving base and an extended operating position in which the trailing end of the carriage protrudes through the entryway and extend away from the receiving base. In the operating mode, an object, such as a parcel of luggage, can be disposed on the top surface of the receiving base, slide off the top surface at the rear end of the receiving base onto the upper surface of the carriage disposed in the extended position, and transported on the roller means toward the trailing end of the carriage. The trailing end of the carriage is designed to extend over the take-away conveyor, where upon leaving the carriage the parcel falls onto the take-away conveyor—all without any lifting being required of the airport personnel.

A disadvantage in the concept underlying the present device is the fact that the necessary height for the receiving base requires the passengers to lift their baggage to a higher elevation in order to deposit their baggage on to the baggage receiving device. A number of modifications can be made to the instant system to ameliorate this concern. One is for the top surface of the receiving base to be sloped at its front end so that the height addition can be minimized. The more that the depth of the nesting carriages are reduced, the shallower the slope angle can be made to similarly reduce and enhance the ergonomics in utilizing this system.

Another preferred embodiment for reducing the initial height of the receiving base is to provide for an inclined conveyor that slopes upwardly from the front of the receiving base to the end that is proximate to the take away conveyor. That this embodiment not only reduces the initial height threshold required for depositing a parcel on the receiving base, the fact that the height of the take away conveyor is generally higher then the ticket counter baggage platform, thus the incline of each receiving device provides for dual advantage. Obviously, these various embodiments can be combined.

The variable height support legs will provide necessary support for the extended carriages regardless whether they are fully extended. An alternative to the manual release system for the support leg that is installed in the handle would be a release associated with the movement of the wheel disposed on the lower end of the support leg. Where movement of the wheel beyond a predetermined threshold would release said legs so that it may retract as carriages are retracted into a closed position.

Still other advantages will be apparent from the disclosure that follows.

SUMMARY OF THE INVENTION

The invention relates to a baggage receiving device comprising a receiving base, at least one carriage, and means for slidably connecting the at least one carriage to the receiving base. The receiving base has a front end, a top surface, and a rear end, with the rear end having an entryway. Each carriage has a bi-directional roller disposed on an upper surface of the at least one carriage.

The at least one carriage can move between a first position in which the at least one carriage is nested substantially below the top surface of the receiving base and a second position in which the trailing end of the at least one carriage protrudes through the entryway and extend away from the receiving base. Thus, an object can be disposed on the top surface of the receiving base, slide off the top surface at the rear end of the receiving base onto the upper surface of the at least one carriage disposed in the second position, and transported on the roller means toward the trailing end of the at least one carriage.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 5 is a cut-away view taken along the line 5—5 of FIG. 4, showing a release mechanism for the variable height support leg;

FIG. 6 is a fourth preferred embodiment of the baggage receiving device of the present invention showing two parallel bi-directional roller means for transporting an object on either side of a stationary surface segment disposed on the top surface of the receiving base;

FIG. 7 is a perspective view of a preferred embodiment where a substantial portion of the top surface of the receiving base comprises a stationary surface segment and further showing a rotatable handle disposed in a vertical position or horizontal position; and FIG. 8 is a front perspective view of the receiving base of the baggage receiving device of the present invention showing a pair of side flanges used for adapting the device for platform openings of varying widths.

DETAILED DESCRIPTION OF THE INVENTION

Figure 1:
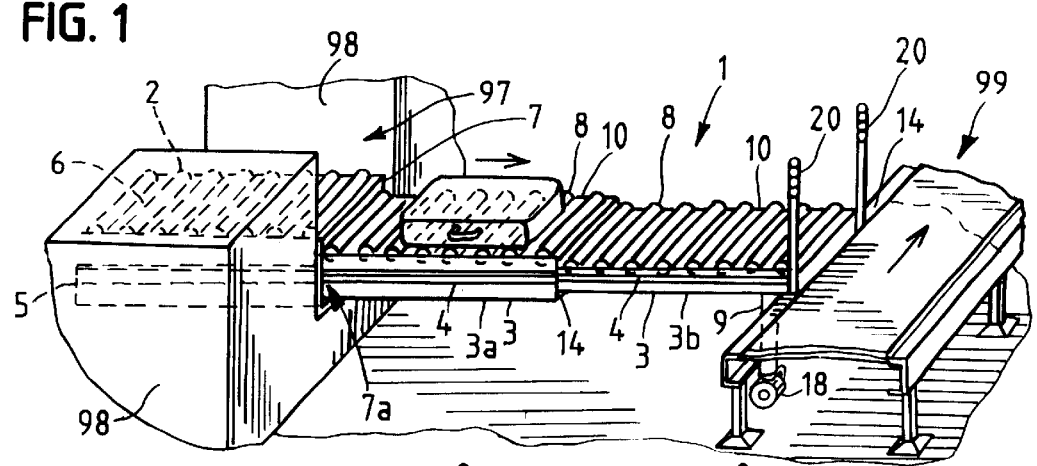
FIG. 1 is a perspective view of the baggage receiving device of the present invention showing the receiving base disposed in a ticket counter baggage platform with a first and second carriage extended to allow baggage that rolls off the device to be collected by a take away conveyor.
Figure 2:
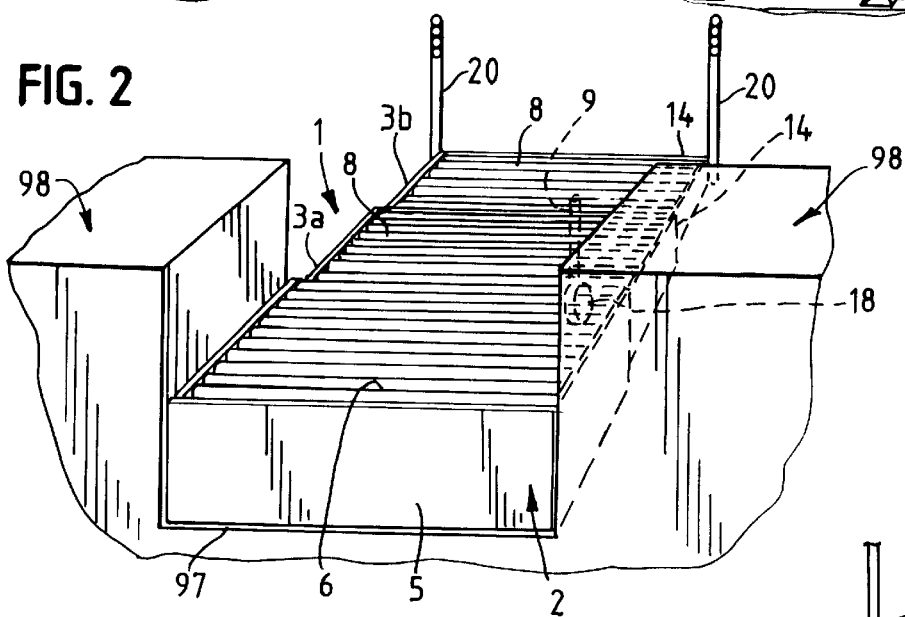
FIG. 2 is a perspective view of the baggage receiving device of the present invention shown from the front of the ticket counter.

The preferred embodiments depicted in the drawing comprise a baggage receiving device 1 specifically designed for airport passenger luggage handling. The baggage receiving device comprises a receiving base 2, at least one carriage 3, and means for slidably connecting 4 the at least one carriage to the receiving base. The receiving base 2 has a front end 5, a top surface 6, and a rear end 7, with the rear end having an entryway 7a. Each carriage 3 has bi-directional rollers 8 disposed on an upper surface 10 of the carriage 3.

Without departing from the generality of the invention disclosed herein and without limiting the scope of the invention, the descussion that follows, will refer to the invention as depicted in the drawing.

The preferred embodiments of the apparatus depicted in the drawing comprise a baggage receiving device 1 comprising a receiving base 2, at least one carriage 3, and means for slidably connecting 4 the at least one carriage 3 to the receiving base 2. The receiving base has a front end 5, a top surface 6, and a rear end 7, with the rear end having an entryway 7a. Each at least one carriage has a leading end 12 and a trailing end 14, and bi-directional roller means 8 for transporting an object between the leading end and the trailing end, which means is disposed on an upper surface 10 of the at least one carriage 3.

The at least one carriage can move between a first position in which the at least one carriage is nested substantially below the top surface of the receiving base and a second position, as shown in FIGS. 1–4, 6 and 7, in which the trailing end 14 of the at least one carriage 3 protrudes through the entryway 7a and extend away from the receiving base 2. Thus, an object can be disposed on the top surface of the receiving base, slide off the top surface at the rear end of the receiving base onto the upper surface of the at least one carriage disposed in the second position, and transported on the roller means toward the trailing end of the at least one carriage.

As shown in FIGS. 1–4 and 6, the top surface 6 of the receiving base 2 may comprise bi-directional roller means 8 for transporting an object between the front end 5 and the rear end 7. Alternatively, the top surface 6 of the receiving base 2 comprises two parallel bi-directional roller means 8a for transporting an object between the front end 5 and the rear end 7, as shown in FIG. 6, the two parallel bi-directional roller means being separated by a stationary surface segment 16.

To stabilize the baggage receiving device, the at least one carriage has at least one support leg 9 which is disposed at a spaced distance from the trailing end 14. Preferably, each of the at least one support leg 9 has a rotating means 18 disposed on a lower end thereof.

Another preferred feature for the baggage receiving device of this important invention is a handle 20 extending upwardly proximate the trailing end 14 of the at least one carriage 3. The handle 20 is disposed so that it will not impede pedestrian traffic in the corridor behind a ticket counter, while the baggage receiving device is in a closed, out of use position. The handle 20 may nonetheless be moveable between a first position in which the handle is generally vertical, as shown in FIG. 7, and a second position in which the handle is disposed in a generally horizontal position (see arrows in FIG. 7), so that it may be less obtrusive.

Another preferred embodiment of the baggage receiving device of the current invention provides that the at least one carriage 3 comprises a first carriage 3a and a second carriage 3b. The first carriage 3a is slidably connected to the receiving base 2, and the second carriage 3b is slidably connected to the first carriage 3a. The second carriage can move between a first position in which the second carriage is nested substantially within the first carriage and a second position in which the trailing end of the second carriage extends outwardly away from the first carriage. Each of the first carriage 3a and second carriage 3b has a leading end 12 and a trailing end 14 and bi-directional roller means 8 for transporting an object between the leading end and the trailing end, which is disposed on an upper surface 10 thereof.

In this way, an object can be disposed on the top surface 6 of the receiving base 2, slide off the top surface at the rear end 7 of the receiving base onto the roller means of the first carriage 7a disposed in the second position, transported on the roller means 8 of the first carriage 7a toward the trailing end 14, slide off the roller means of the first carriage onto the roller means of the second carriage 7b disposed in the second position, transported on the roller means of the second carriage toward the trailing end, and slide off the roller means of the second carriage. Whereupon it can be removed form the ticket counter area by an airport takeaway conveyor 99 which is generally located in back of the ticket counter 98.

Preferably, the means for slidably connecting 4 each of the receiving base to the first carriage and the second carriage to the first carriage are aligned, as shown in the drawing, so that a telescoping relationship between the receiving base 2, the first carriage 3a, and the second carriage 3b is accomplished.

The receiving base is best suitably sized to fit into a baggage platform 97 of an airport ticket counter 98 where it may be used to transport luggage deposited onto the receiving base 2 by a passenger and readily transported to the take away conveyor 99 behind the ticket counter 98.

In a preferred aspect of the invention, as shown in FIG. 8, the receiving base 2 has a pair of side flanges 22 with at least one of the pair of side flanges being moveable relative to the other of the pair of side flanges 22. This allows the width of the receiving base 2 to be varied to fit a number of baggage platforms 97 of different width. Each of the pair of side flanges may have a horizontal spacer 24 extending proximate the top surface 6 from the front end to the rear end and an upstanding vertical wall 26 extending along an outer edge of the horizontal spacer 24.

Figure 3:
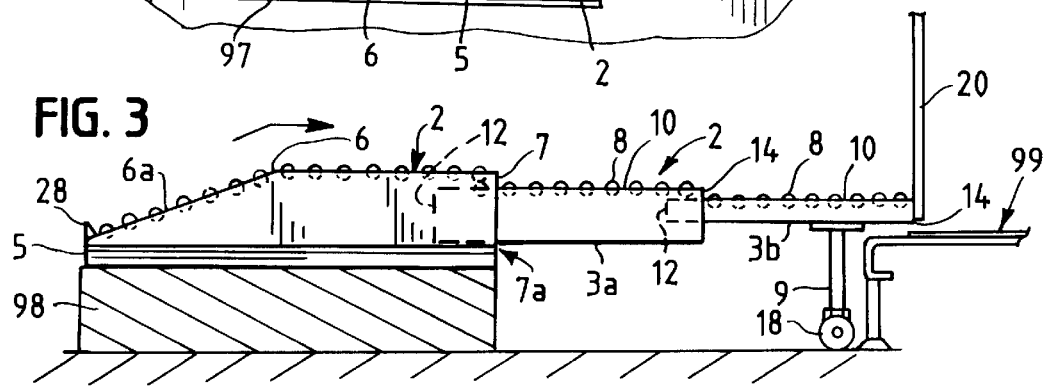
FIG. 3 is a side elevation schematic view of a second preferred embodiment of the baggage receiving device of the present invention showing a front portion of the top surface of the receiving base sloping upwardly from the front end to allow easier access for a passenger's bag and further showing an upwardly extending lip disposed proximate the front end to maintain the baggage disposed on the sloped surface.

In another preferred embodiment of the baggage receiving device as best shown in FIG. 3, a front portion 6a of the top surface 6 of the receiving base 2 slopes upwardly from the front end 5 to a predetermined distance from the rear end. Additionally, the front end of the receiving base has an upwardly extending lip 28 for securing baggage placed thereon.

Figure 4:
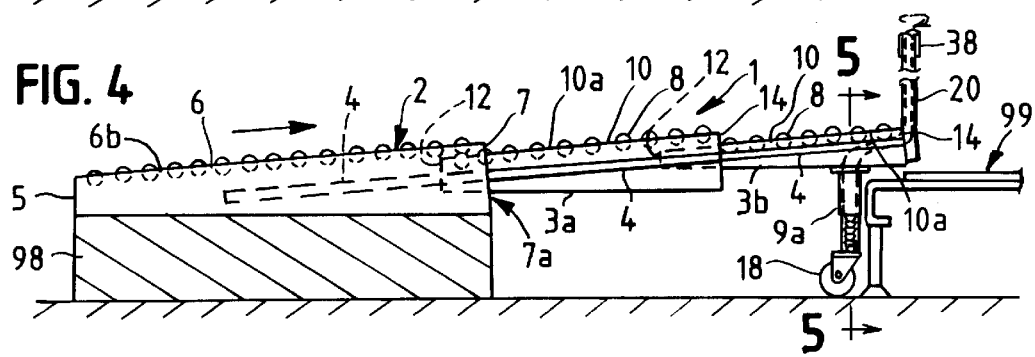
FIG. 4 is a side elevation schematic view of a third preferred embodiment of the baggage receiving device of the present invention showing the device with a generally inclined upper transport surface and having a variable height support leg and associated release on a handle.

In another preferred embodiment of the baggage receiving device of the current invention, as shown in FIG. 4, a receiving base 2, a first carriage 3a and a second carriage 3b, and means for slidably connecting 4 are provided. The receiving base has a front end, an inclined top surface 6b, and a rear end, the rear end has an entryway.

Each carriage has an inclined upper surface 10a, a leading end and a trailing end, and bi-directional roller means for transporting an object between the leading end and the trailing end, which means is disposed on an upper surface thereof.

The second carriage has at least one variable height support leg 9a with means for adjustably securing 30 the height of the leg 9a. The at least one variable height support leg is disposed at a spaced distance from the trailing end 14, so that the second carriage may extend over the take-away conveyor 99.

The first carriage is slidably connected to the receiving base, and the second carriage is slidably connected to the first carriage. The second carriage can move between a first position in which the second carriage is nested substantially within the first carriage and a second position in which the trailing end of the second carriage extends outwardly away from the first carriage.

The means for slidably connecting 4 the at least one carriage 3 to the receiving base 2 allows the at least one carriage 3 to move between a first position in which the at least one carriage is nested substantially below the top surface of the receiving base and a second position in which the trailing end of the at least one carriage protrudes through the entryway and extend away from the receiving base.

Whereby, an object can be disposed on the top surface of the receiving base, slide off the top surface at the rear end of the receiving base onto the roller means of the first carriage disposed in the second position, transported on the roller means of the first carriage toward the trailing end, slide off the roller means of the first carriage onto the roller means of the second carriage disposed in the second position, transported on the roller means of the second carriage toward the trailing end, and slide off the roller means of the second carriage.

Preferably, the at least one variable height support leg has a telescoping shaft 32, a shown in FIG. 5, with biasing means 34 for urging a maximum height. The means for adjustably securing 30 the height of the leg comprises a locking mechanism 36 associated with the telescoping shaft 32 which has a release 38 connected to the handle 20. The height of the leg is adjustably biased to its maximum height and secured by the locking mechanism 36, and can be released though actuation of the handle as the device is collapsed into an out of use position.

Another embodiment of the baggage receiving device of the present invention shown in FIG. 6, comprises a receiving base 2, at least one carriage 3, and means for slidably connecting 4 the at least one carriage to the receiving base.

The receiving base has a front end, a top surface, and a rear end. The rear end has an entryway, and the top surface has bi-directional roller means for transporting an object between the front end and the rear end.

Each at least one carriage has a leading end and a trailing end, and two parallel bi-directional roller means 8a for transporting an object between the front end and the rear end. The two parallel bi-directional roller means are separated by a stationary surface segment 16, which is disposed on an top surface 6 thereof.

The at least one carriage comprises a first carriage 3a and a second carriage 3b. The first carriage is slidably connected to the receiving base by means for slidably connecting, and the second carriage being slidably connected to the first carriage by means for slidably connecting. The second carriage can move between a first position in which the second carriage is nested substantially within the first carriage and a second position in which the trailing end of the second carriage extends outwardly away from the first carriage.

Each of the first carriage 3a and the second carriage 3b has a leading and a trailing end and bi-directional roller means for transporting an object between the leading end and the trailing end, which is disposed on an upper surface 10 thereof. The second carriage has at least one support leg and has a handle extending upwardly proximate the trailing end thereof. The at least one support leg with a rotating means disposed on a lower end thereof and is disposed at a spaced distance from the trailing end.

Means for slidably connecting 4 the at least one carriage 3 to the receiving base 2 allows the at least one carriage to move between a first position in which the at least one carriage is nested substantially below the top surface 6 of the receiving base 2 and a second position in which the trailing end 14 of the at least one carriage 3 protrudes through the entryway 7a and extend away from the receiving base 2.

In this way, an object can be disposed on the top surface 6 of the receiving base 2, slide off the top surface at the rear end of the receiving base onto the roller means of the first carriage 3a disposed in the second position, transported on the roller means 8 of the first carriage toward the trailing end 14, slide off the roller means of the first carriage onto the roller means of the second carriage 3b disposed in the second position, transported on the roller means 8 of the second carriage toward the trailing end, and slide off the roller means of the second carriage.

The baggage receiving device can be made with readily available roller conveyor systems though plastic rollers would be preferred due to their lighter weight. Additionally, standard industrial slide mechanisms for slidably connecting the carriages to one another and to the receiving base are readily available. The remaining components are made out of sheet metal and other standard industrial materials.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

What is claimed as being new and desired to be protected by Letters Patent of the United States is a follows:

1. In an environment which includes an airline ticket counter provided with a baggage platform, and a take-away conveyor accessible to but spaced from the baggage platform, a baggage receiving device comprising:

a. a receiving base disposed on the baggage platform and having a front end, a top surface, and a rear end, said rear end having an entryway;

b. at least one carriage, each at least one carriage having a leading end and a trailing end, and bi-directional roller means for transporting an object between the leading end and the trailing end, which means is disposed on an upper surface thereof; and c. means for slidably connecting the at least one carriage to the receiving base, in which the at least one carriage can move between a first position in which the at least one carriage is housed in the receiving base and a second position in which the trailing end of the at least one carriage protrudes through the entryway and extends away from the receiving base over the take-away conveyor, whereby, the at least one carriage can be moved to the first position to allow pedestrian traffic in the corridor behind the airline ticket counter, and the at least one carriage can be moved to the second position to allow baggage to be transferred from the baggage platform of the airline ticket counter to the take-away conveyor independent of any lifting being required by airport personnel.

2. The baggage receiving device of claim 1, wherein the top surface of the receiving base comprises bi-directional roller means for transporting an object between the front end and the rear end.

3. The baggage receiving device of claim 1, wherein the top surface of the receiving base comprises two parallel bi-directional roller means for transporting an object between the front end and the rear end, said two parallel bi-directional roller means being separated by a stationary surface segment.

4. The baggage receiving device of claim 1, wherein the at least one carriage has at least one support leg, said at least one support leg being disposed at a spaced distance from the trailing end.

5. The baggage receiving device of claim 4, wherein each of the at least one support leg has a rotating means disposed on a lower end thereof.

6. The baggage receiving device of claim 3, wherein the at least one carriage has a handle extending upwardly proximate the trailing end thereof.

7. The baggage receiving device of claim 5, wherein the at least one carriage comprises a first carriage and a second carriage, the first carriage being slidably connected to the receiving base, and the second carriage being slidably connected to the first carriage, in which the second carriage can move between a first position in which the second carriage is nested substantially within the first carriage and a second position in which the trailing end of the second carriage extends outwardly away from the first carriage, each of said first carriage and second carriage having a leading end and a trailing end and bi-directional roller means for transporting an object between the leading end and the trailing end, which is disposed on an upper surface thereof, whereby, an object can be disposed on the top surface of the receiving base, slide off the top surface at the rear end of the receiving base onto the roller means of the first carriage disposed in the second position, transported on the roller means of the first carriage toward the trailing end, slide off the roller means of the first carriage onto the roller means of the second carriage disposed in the second position, transported on the roller means of the second carriage toward the trailing end, and slide off the roller means of the second carriage.

8. The baggage receiving device of claim 7, wherein the means for slidably connecting each of the receiving base to the first carriage and the second carriage to the first carriage are aligned, so that a telescoping relationship between the receiving base, the first carriage, and the second carriage is accomplished.

9. The baggage receiving device of claim 8, wherein the receiving base is suitably sized to fit into a baggage platform of an airport ticket counter.

10. The baggage receiving device of claim 1, wherein a front portion of the top surface of the receiving base slopes upwardly from the front end to a predetermined distance from the rear end.

* * * * *